Patented Dec. 24, 1940

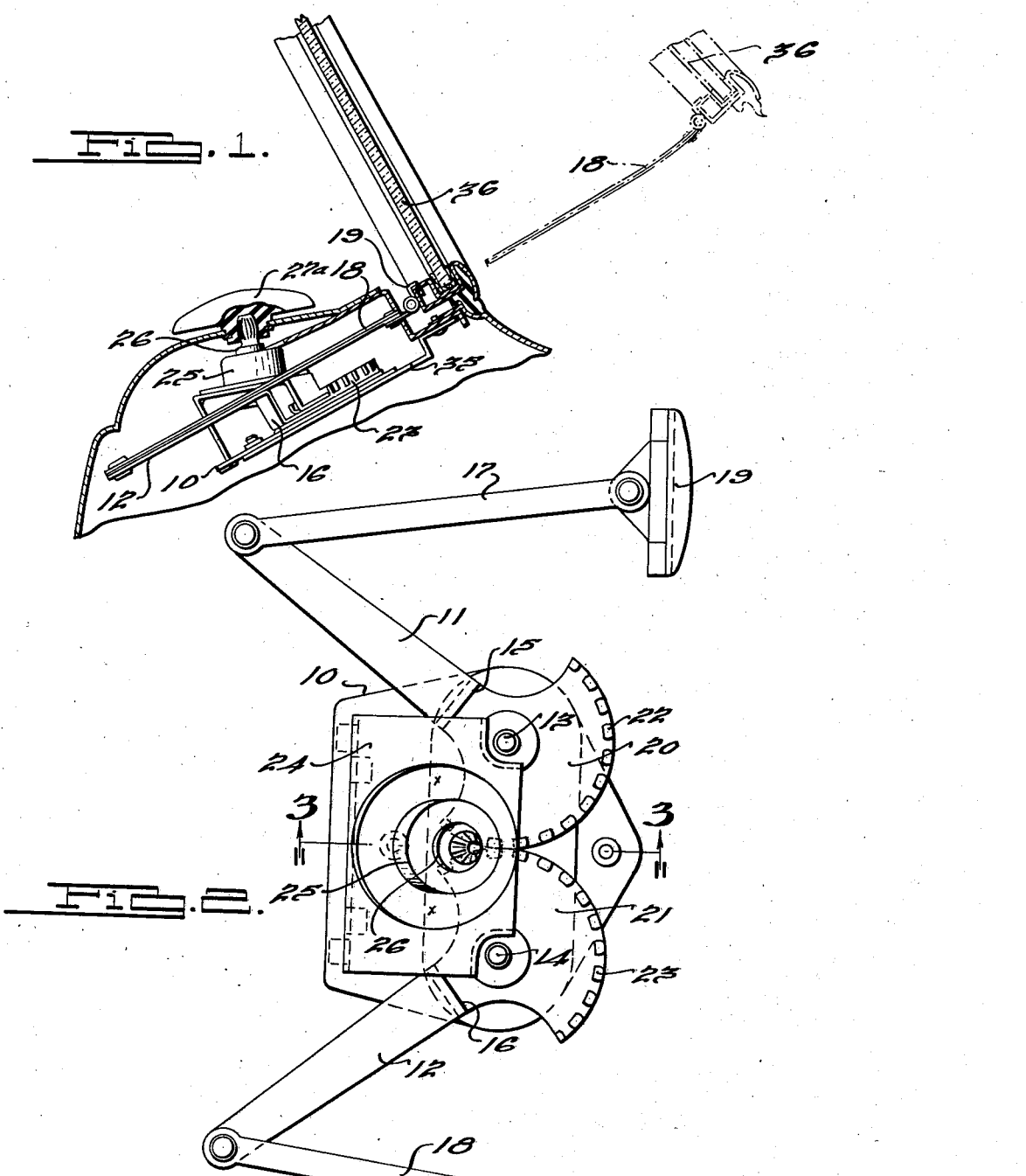

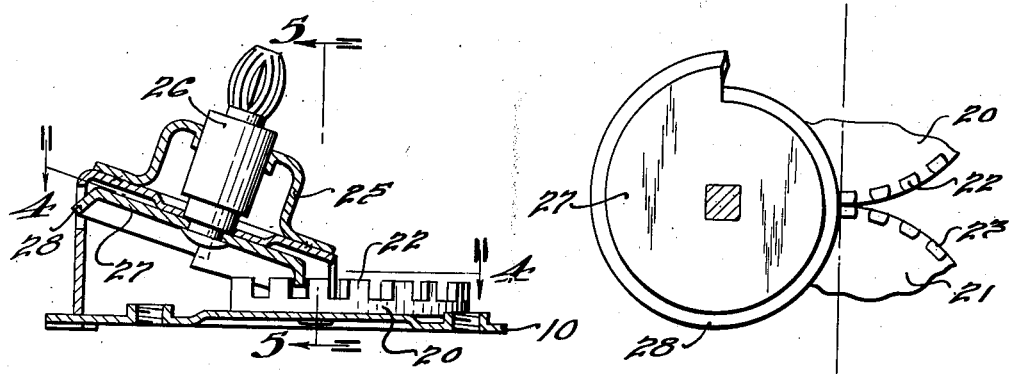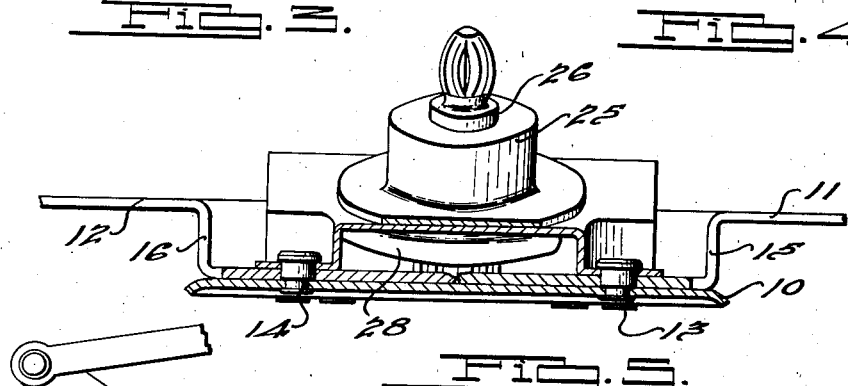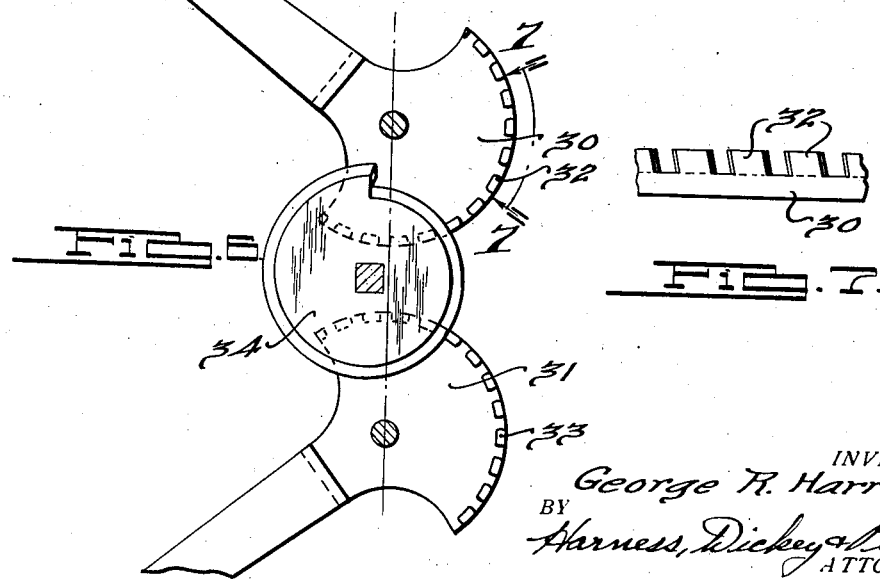

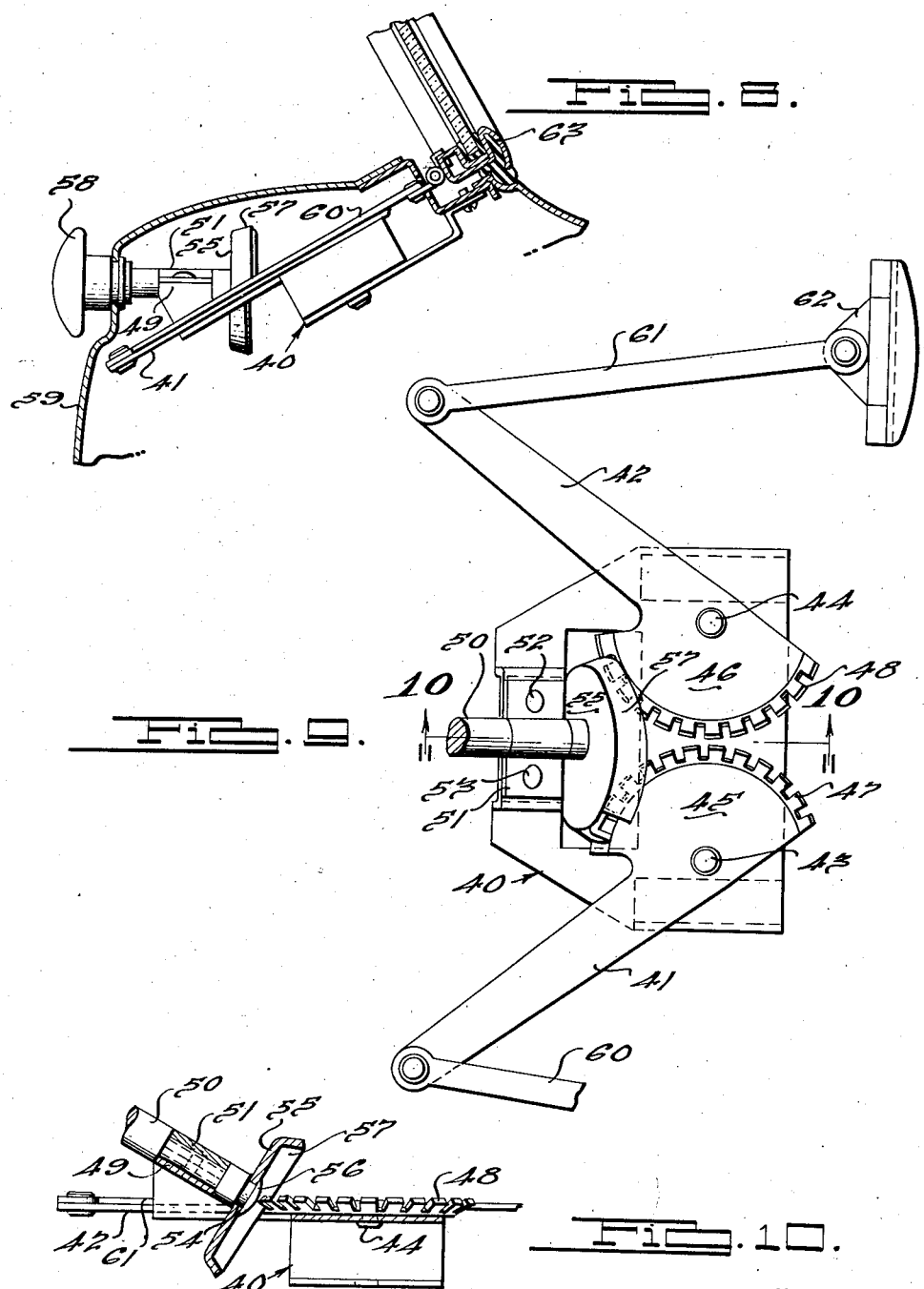

2,226,376

UNITED STATES PATENT OFFICE 2,226,376

WINDOW OPERATING MECHANISM

George R. Harrison, Detroit, Mich., assignor to National Stamping Company, Detroit, Mich., a corporation of Michigan Application September 23, 1938, Serial No. 231,280

3 Claims. (Cl. 74—424.5)

This invention relates to window operating mechanism particularly for operating or opening and closing an automobile windshield of the divided type.

The main objects of this invention are to provide an improved form of window operating mechanism of extreme simplicity and having a minimum number of parts; to provide a mechanism of this character which can be made substantially entirely from sheet metal stampings; and to provide a rugged, durable operating mechanism which will give long life and satisfactory service with a minimum of attention for repairs.

An illustrative embodiment of this invention is shown in the accompanying drawings in which:

Figure 1 is a fragmentary view, partly in section and partly in elevation, showing the improved operating mechanism mounted on an automobile instrument panel for operating the windshield thereof;

Fig. 2 is a plan view of the improved operating mechanism;

Fig. 3 is a sectional view taken on the line 3—3 of Fig. 2, looking in the direction indicated by the arrows;

Fig. 4 is a fragmentary view, partly in section and partly in plan, taken along the line 4—4 of Fig. 3, looking in the direction indicated by the arrows;

Fig. 5 is a sectional view taken along the line 5—5 of Fig. 3, looking in the direction indicated by the arrows;

Fig. 6 is a plan view of the operating arms and actuating gear showing a modified form of the invention; and Fig. 7 is an enlarged view showing the gear teeth on one of the operating arms of the modified form and as viewed from the line 7—7 of Fig. 6.

Fig. 8 is a fragmentary view, partly in section and partly in elevation, showing a modified form of operating mechanism mounted on an automobile instrument panel with the control knob extending out horizontally to the front thereof.

Fig. 9 is a plan view of the modified form of operating mechanism illustrated in Fig. 8.

Fig. 10 is a sectional view taken on the line 10—10 of Fig. 9, looking in the direction indicated by the arrows.

The invention herein shown and described is of the same general form as that shown in the co-pending application of Willard F. Thoma, Serial No. 221,573, filed July 27, 1938, and assigned to the assignee of the present invention.

At the present time, the general trend of design is toward extreme simplification, the result of which is usually a saving in cost of manufacture of the various accessories applied to the present day automobile. In the design of mechanisms of this character, elimination of a single part of the structure usually results in a reduction of several manufacturing operations and thereby effects a saving in the manufacturing cost of the article as a whole.

In the construction shown in the drawings, a base plate 10, in the form of a sheet metal stamping, has a pair of operating arms or levers, generally designated 11 and 12, journalled on spaced parallel pivots 13 and 14, respectively, which are riveted to the base plate 10. The arms 11 and 12 are offset at 15 and 16, respectively, and their outer ends are pivotally attached to one end of resilient links 17 and 18, respectively, the opposite ends of which are pivotally connected to attaching clips 19. The clips 19 are adapted to be secured to the lower edge of a swinging windshield or the like. Details of the links 17 and clips 19 are more fully set forth in the above referred to co-pending application.

The arms 11 and 12 extend beyond their points of pivotal connection and are of segmental shape, being substantially semi-circular when viewed in plan, as indicated at 20 and 21, respectively. The arcuate marginal edges of the segment shaped portions 20 and 21 are turned up at right angles forming a flange which is suitably notched out to provide teeth 22 and 23, respectively, thus forming gear wheels. In the preferred form as shown in Fig. 2 of the drawings, the pivotal mountings are positioned so as to cause the teeth on one segment to contact with the teeth on the other segment when the two arms are rotated in unison.

The base plate 10 has an upstanding bridge member 24 of inverted U-shape mounted thereon and which is provided with a sloping upper surface upon which is welded an inverted cup-shaped shaft supporting member 25. The top surface of the bridge member 24 and the cup member 25 are suitably apertured in alignment with the metal turned in adjacent their respective apertures to form spaced journal bearing supports for a driving gear shaft 26, the outer end of which is formed to receive a manually operable, T-shaped handle 27. The inner end of the shaft 26 is of square cross-section and has mounted thereon a shallow cup-shaped spiral face gear member 27 which is provided with a flaring rim 28 shaped in the form of a spiral when viewed in plan as shown in Fig. 4 of the drawings. The flared rim 28 is arranged and positioned to mesh in the spaces between the teeth 22 and 23 of the gear wheels 20 and 21 integrally formed with the operating arms at their point of contact so as to drive both of the gear wheels in unison, but in opposite directions.

In the modified form shown in Figs. 6 and 7 of the drawings, the gear wheel segments 30 and 31 are spaced apart on the mounting plate 10 sufficiently to allow substantial space between the upstanding teeth 32 and 33 thereon at their nearest point. A spiral face gear 34 meshes between the teeth 32 and 33, as in the preferred form, but due to the spacing apart of the gear wheels 30 and 31, the teeth thereon must necessarily be formed at a slant, as shown most clearly in Fig. 7 of the drawings, in order to mesh with the flaring rim or tooth of the gear 34.

Either the preferred or the modified form of actuating mechanism is mounted, as shown in Fig. 1 of the drawings, upon a bracket 35 which in turn is secured to the cowl adjacent the front end of the instrument panel of an automobile, and the links 17 and 18 and operating arms 11 and 12 extend through a slot suitably formed therein, in the same plane as the arms and links, as shown in Fig. 1 of the drawings.

Due to the flexibility of the links 17 and 18 the windshield 36 is projected outwardly and swings upwardly, as shown in dotted outline in Fig. 1, without throwing any undue strain upon the arms 11 or their pivotal supports and mounts 13 and 14.

In the modified form shown in Figs. 8, 9 and 10 of the drawings, the arrangement is such that the operating control handle extends horizontally through the instrument panel, as shown most clearly in Fig. 8. In this modification a mounting plate, generally designated 40, has a pair of operating arms 41 and 42 pivoted thereon at 43 and 44, respectively, so as to be swingable in a plane substantially parallel to the mounting plate. The arms 41 and 42 extend beyond their points of pivotal mounting and are shaped to provide segments 45 and 46, respectively, the arcuate marginal edges of which are turned upwardly at a small angle and notched out to provide a plurality of gear teeth 47 and 48, respectively.

The mounting plate 40 is struck upwardly, as indicated at 49, Fig. 10, to provide an inclined bearing surface for an operating shaft 50. The shaft 50 has a reduced portion for receiving the bearing surface 49 and is held thereon by a cap 51 which is attached by rivets 52 and 53, or other suitable means, such as welding or the like. The inner end of the shaft 50 is square in cross section, as shown at 54, to receive a square opening in the center of a cup shaped spiral face gear 55 which is held thereon by riveting over the end of the shaft, as shown at 56. The rim 57 of the cup shaped gear 55 is in the form of a spiral and is shaped and positioned so as to engage in the notches which form the teeth 47 and 48 of the operating arm segments.

The outer end of the shaft 50 is provided with an operating handle 58 which protrudes from the face of the instrument panel 59 in convenient position to be grasped by the operator and rotated.

The outer ends of the arms 41 and 42 are provided with pivoted flexible links 60 and 61, respectively, in the same manner as that described in the preceding embodiments, and these links are attached by suitable hinge clips 62 to the windshield frame 63 in the usual manner.

Although but three specific embodiments of this invention have been shown and described, it will be understood that further details of the construction shown may be altered or omitted without departing from the spirit of this invention, as defined by the following claims.

I claim:

1. In a gearing mechanism, a base plate, a pair of operating arms pivoted on said base plate, each of said arms extending beyond its respective point of pivotal support, the extended ends of said arms being in the form of segments, the marginal edges of each of said segments being turned up at an angle to the plane of its segment and notched out to form gear teeth extending transversely to the plane of said segments, and a spiral face gear meshing with the gear teeth on each of said segments for operating said arms in unison.

2. In a gearing mechanism, a supporting base, a pair of operating arms pivoted on said base in spaced relation, each of said arms extending beyond its point of pivotal connection and formed in the shape of a segment, the marginal edges of each of said segmental portions being turned up at an angle to the plane of its segment and notched out to form gear teeth thereon, the points of pivotal mounting of said segmental portions being such that the adjacent gear teeth of the respective segmental portions are in contact one with the other, and a spiral face gear meshing with the gear teeth on both of said segmental portions for driving said arms in unison.

3. In a gearing mechanism, a supporting base, a pair of operating arms pivoted on said base, each of said arms extending beyond its point of pivotal connection, such extended ends being in the form of segments, the arcuate marginal edge of each of said segments being turned up at an angle to the plane of its segment and notched out to form gear teeth integrally formed thereon and disposed substantially normal to the plane of said segments, the arcuate marginal edges of said segments being in spaced relation to each other, and a spiral face gear spanning the space between said segments and meshing with the teeth on both of said segments for driving said arms in unison.

GEORGE R. HARRISON.